Dec. 29, 1970  J. J. DAMICO ET AL  3,551,240
METHOD OF AND APPARATUS FOR BONDING
Filed June 5, 1967  2 Sheets-Sheet 1
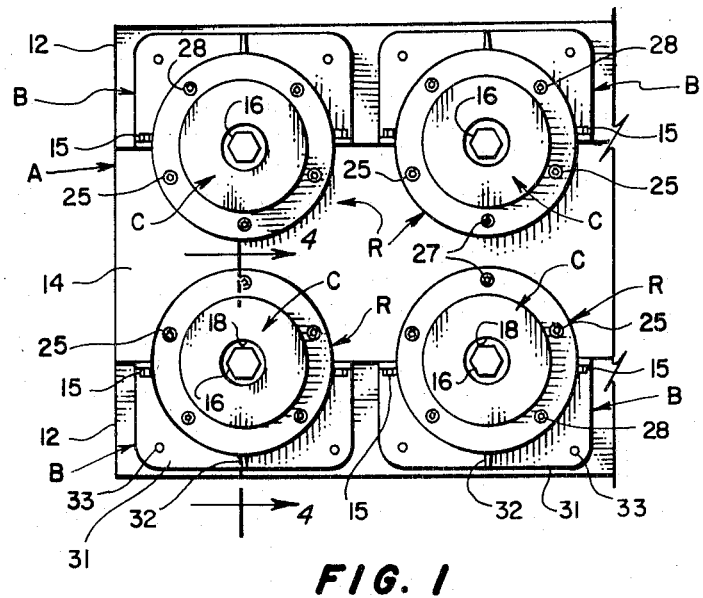
FIG. 1
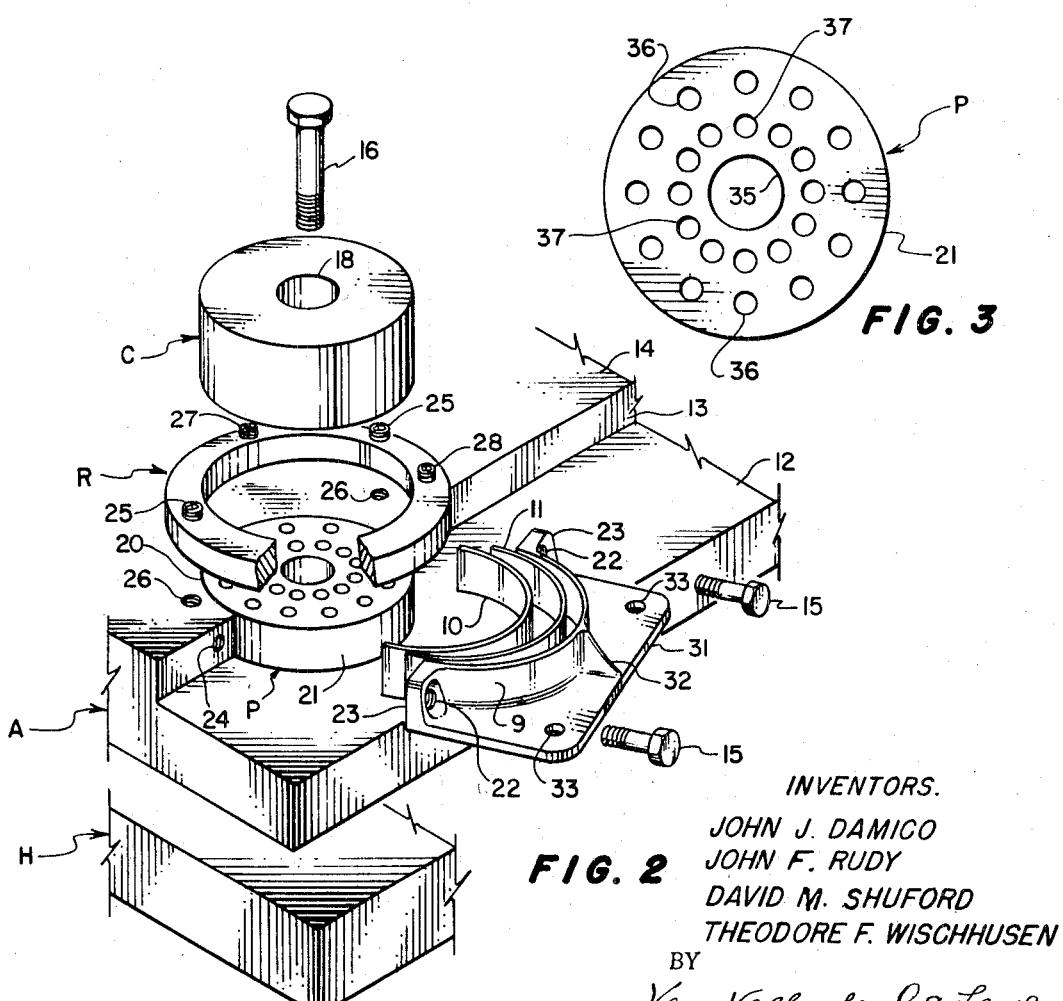
FIG. 3
FIG. 2
INVENTORS.
JOHN J. DAMICO
JOHN F. RUDY
DAVID M. SHUFORD
THEODORE F. WISCHHUSEN
BY
Van Valkenburgh & Lowe
ATTORNEYS

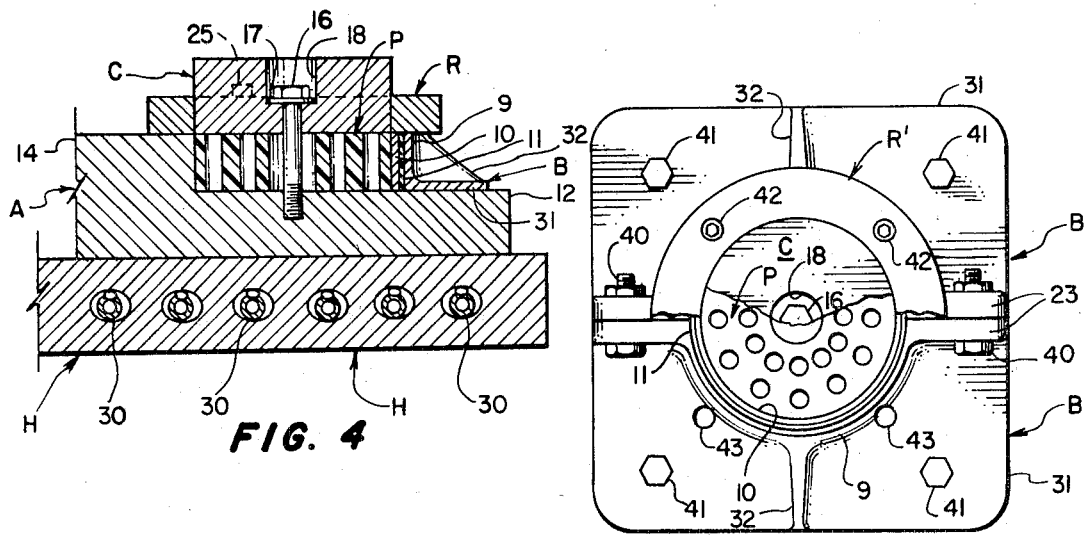
FIG. 4
FIG. 5
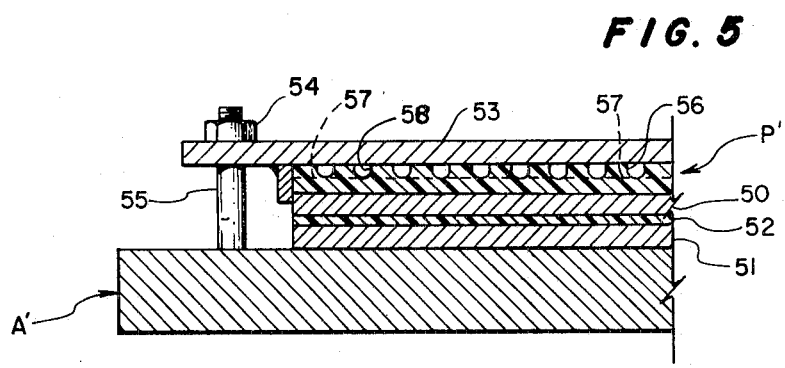
FIG. 6
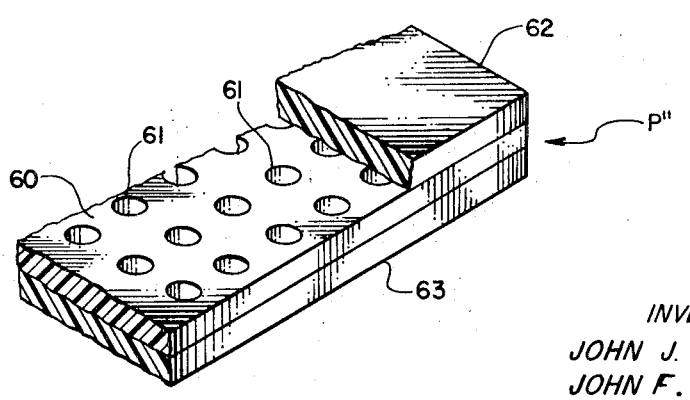
FIG. 7
INVENTORS.
JOHN J. DAMICO
JOHN F. RUDY
DAVID M. SHUFORD
THEODORE F. WISCHHUSEN
BY
Van Valkenburgh & Lowe
ATTORNEYS United States Patent Office 3,551,240
Patented Dec. 29, 1970

3,551,240
METHOD OF AND APPARATUS FOR BONDING
John J. Damico, Englewood, and John F. Rudy, David M. Shuford, and Theodore F. Wischhusen, Littleton, Colo., assignors to Martin Marietta Corporation, New York, N.Y., a corporation of Maryland
Filed June 5, 1967, Ser. No. 643,722
Int. Cl. B32b 31/20
U.S. Cl. 156—228                                   12 Claims

ABSTRACT OF THE DISCLOSURE

This invention is a method and apparatus for bonding, particularly dissimilar metals bonded by an epoxy resin, wherein the pressure during bonding is controlled by apertures, in a block or pad of heat expandable material, such as silicone rubber, which is confined and bears against one of the parts to be bonded. The apertures are preferably uniform, spaced from the surface engaging a part and may be holes, slots, grooves, etc. When the surfaces to be bonded are arcuate or circular, the silicone rubber block is cylindrical and the apertures comprise axial holes therein. Other types of expandable pressure blocks or pads are also shown. The pressure block may also be through a clamping bolt and torque wrench.

---

This invention relates to bonding, and more particularly to bonding, as of dissimilar metals, by a bonding material which is bonded to the surfaces to be joined through heat and pressure.

Previously, the pressure for such bonding has been produced by the use of "C" clamps, or in an autoclave, or through use of hydraulic pressure, or by the use of so-called pressure bags or vacuum bags. Hydraulic presses require complicated and special jigs or fixtures, in order to clamp two surfaces together during bonding, as by a strip of bonding material inserted therebetween, except when the surfaces are flat, while vacuum bags and pressure bags require vacuum pumps or pressure pumps and associated control equipment, as well as an oven for heating. Furthermore, an autoclave, in which both heat and pressure are produced, is an expensive piece of equipment. In addition, both the pressure and temperature cannot always be suitably controlled, particularly when the surfaces to be joined are irregular, such as concave or convex, i.e., other than flat.

Among the objects of this invention are to provide a novel method of bonding two parts together, particularly two parts formed of dissimilar metals or other materials; to provide such a method which is particularly adapted to be utilized in bonding two parts formed of dissimilar metals through a bonding resin which requires control of both temperature and pressure, during the bonding operation; to provide such a bonding method which is particularly adapted to be utilized in bonding two parts which are curved or otherwise irregular in form; to provide such a method in which the pressure exerted against the two parts, during bonding, is controllable within adequately narrow limits; to provide such a method which is adaptable to different sizes and shapes of parts to be joined; to provide apparatus which is particularly adapted to carry out the method of this invention; to provide such apparatus which requires a minimum of special equipment; to provide such apparatus which may be readily varied to suit the requirements imposed by the shape and configuration of the parts to be joined, as well as other factors; to provide such apparatus by which readily reproducible results may be obtained; and to provide such apparatus which is effective and efficient in use.

Additional objects of this invention and the novel features thereof will become apparent from the description which follows, taken in conjunction with the accompanying drawings, in which:

FIG. 1 is a top plan view of a portion of apparatus constructed in accordance with this invention and by which a plurality of inserts are bonded to bearing retainers simultaneously in accordance with the method of this invention;

FIG. 2 is an exploded, fragmentary isometric view of the parts at one corner of the apparatus of FIG. 1;

FIG. 3 is a top plan view of a silicone rubber, cylindrical block utilized in the apparatus of FIG. 1, showing particularly the pattern of a series of holes suitable for producing the desired pressure during bonding;

FIG. 4 is a fragmentary vertical section, taken along line 4—4 of FIG. 1;

FIG. 5 is a top plan view, partly broken away, of the upper portion of apparatus similar to FIG. 1 but modified for bonding inserts to two bearing retainers clamped together;

FIG. 6 is a fragmentary vertical section of apparatus for bonding a pair of plates or the like; and FIG. 7 is a fragmentary isometric view, partly broken away, of alternative silicone rubber pressure pads for bonding a pair of plates or the like together.

The method of this invention, used in bonding two parts together through heat and pressure fusion of the bonding material to the parts, comprises clamping the parts with the bonding material between the surfaces of the parts to be joined and applying pressure to the bonding material through one of the parts by a confined, expandable, flowable material which applies pressure to the bonding material through one of the parts through expansion upon heating to the desired bonding temperature. Since a resinous bonding material, such as an epoxy resin, should be heated for a predetermined period of time to secure an effective bond, the pressure developed by the confined, expandable and flowable material is controlled by apertures in the expandable material. A suitable expandable material comprises a block of silicone rubber, such as of 100 Durometer, although other materials having similar properties may be utilized. The apertures in the material are preferably uniformly spaced and are spaced from the surface by which the pressure is applied through one of the parts to the bonding material, so that a substantially uniform pressure against the bonding material will be obtained. The expandible material is preferably a single, integral block or pad, although several layers of material may be utilized, particularly when relatively flat or comparatively flat surfaces are to be joined. However, the method of this invention is particularly adapted for use in bonding arcuate or circular surfaces of two parts, particularly when one of the parts is arcuate, since then a cylindrical block of expandable material may be utilized and the apertures may be disposed in an axial direction of the cylinder.

As illustrated in FIGS. 1 and 2, the inner surface of an arcuate flange 9 of a bearing retainer B may be bonded to an insert 10, as through use of an epoxy strip 11, through heat supplied from a heating platen H and pressure supplied by a pressure block or pad P. The bearing retainer B may be an aluminum alloy casting, while the insert 10 may be a semicircular, sintered bronze part having a Teflon coating on the inside. Pressure block P may be formed of a silicone rubber of 60 Durometer, although other expandable, flowable materials having similar properties may be utilized, while strip 11 may be Shell Epon 951 or Bloomingdale Epoxy FM-1000. Prior to bonding, the surfaces to be bonded are preferably precoated, as by spraying with Epon 952. Each bearing retainer B is mounted on a surface 12 of an anchor plate A, being secured to a face 13 of a shoulder 14 by bolts 15, with a series of bearing retainers B and associated parts mounted on opposite sides of shoulder 14. The bearing retainer B and insert 10 are clamped against surface 12 by a clamping ring R, while a clamping cylinder C exerts a predetermined amount of pressure against pressure block P, as through tightening of a bolt 16 which extends centrally through cylinder C and the head of which, as well a washer 17, is received in a socket 18 of the cylinder, as in FIG. 4.

One-half of cylindrical pressure block P is received in a recess 20 machined into shoulder 14, so that the outer surface 21 of pressure block P will bear against the inside of insert 10 and also against the circular surface of recess 20. Of course, pressure block P also bears upwardly against clamping cylinder C and downwardly against surface 12 and the continuation thereof within recess 20. Each bolt 15 extends through a hole 22 in a lateral flange 23 of bearing retainer B, to engage a threaded hole 24 extending into face 13, while clamping ring R is secured to shoulder 14 by bolts 25, shown as having internal hex heads and engaging threaded holes 26 extending into shoulder 14. A set screw 27, as in FIG. 1, may extend through each clamping ring R to bear against shoulder 14, while a pair of set screws 28 may bear against bearing retainer B. If desired, a spacing ring, such as a series of washers, may be placed around bolts 25, so as to space clamping ring R from shoulder 14, so that set screws 27 and 28 may be more readily adjusted, as well as to accommodate slightly different widths of flange 9 of bearing retainers B. Also, if desired, the inner diameter of clamping ring R and the outer diameter of clamping cylinder C may be increased slightly, with an undercut or shoulder formed at the lower edge of cylinder C which corresponds to the outer diameter of pressure block P.

As in FIG. 4, heating platen H may be provided with a series of electrical heating units 30. Each bearing retainer B is completed by a base flange 31 and a reinforcing rib 32, with holes 33 for bolts which attach each bearing retainer to a supporting structure and additional such holes, if desired.

As will be evident, with anchor plate A resting on heating platen H, heat will be supplied from the heating platen to heat anchor plate A and the parts mounted thereon to the desired bonding temperature, such as 345° F. for the epoxy resin identified as Epon 951. The temperature is maintained for an appropriate period of time to cure the bonding resin. It will be understood, of course, that the anchor plate A, with the parts attached thereto as described, may be heated in an oven, rather than by heating platen H. As will be evident, upon heating, the pressure block P will expand and, being confined, will tend to create a considerable pressure, depending upon the temperature to which heated. However, a solid block of expandable, flowable material, such as silicone rubber of 60 Durometer, or other material having similar properties, would normally produce too high a pressure, since silicone rubber will expand volumetrically approximately 3.3 to 4.4 times $10^{-4}$ inches per inch per degree F.

In accordance with this invention, the expandable pressure block or pad is provided with a series of apertures which may be grooves, holes, slots or other types of apertures, which preferably do not extend to the surface at which pressure is exerted against one of the parts to be bonded, such as the outer surface 21 of pressure block P, and which are preferably substantially uniform in arrangement. Thus, a suitable pattern of holes for bonding insert 10 to flange 9 of bearing retainer B is illustrated in FIG. 3, although it will be understood that numerous other and different hole patterns may be utilized. The holes shown comprise an inner hole 35 which is larger than bolt 16, and an outer annular series of spaced holes 36 and an inner annular series of spaced holes 37. As shown, there are twelve holes in each of the inner and outer series of holes, although this number may be varied. However, the required amount of hole area in a pressure block P having an outside diameter of 4 inches and a height of 1.5 inches, for producing a pressure of approximately 125 pounds per square inch against insert 10 when heated to 345° F., was found to be a one inch diameter for inner hole 35 and five-sixteenth inch diameter for the holes 36 and 37. It will be evident, of course, that for different conditions, a desired hole pattern may be readily determined, using as a basis the hole pattern of FIG. 3 and the relative proportion of the amount of material removed by the holes, for different conditions, such as when a greater pressure during bonding is desired, or the bonding temperature is higher or lower, or other conditions are varied. It was also found that more reproducible results were secured when each bolt 16 was tightened to a specific torque, such as 25 inch pounds for a one-half inch diameter bolt and conditions as set forth above.

After the inserts 10 are bonded to the bearing retainers B in the manner described above, they may be removed from the fixture. For use, the bearing retainers B will be clamped together in pairs by bolts extending through holes 22 and attached to a suitable supporting structure, as by bolts or cap screws extending through holes 33 or other holes, as required If desired, an insert 10 may be attached to the inner flange 9 of each bearing retainer B simultaneously, as illustrated in FIG. 5, in which the two bearing retainers are attached together by bolts 40, extending through holes 22 of FIG. 2, and cap screws 41 extending through holes 33 of FIG. 2 into an anchor plate (not shown). In addition, cap screws 42 may extend to the anchor plate, through a clamping ring R' and also through holes 43 provided for that purpose in the base flange 31 of each bearing retainer B. As before, the inner surface of inner flanges 9, as well as the outer surface of each insert 10, is precoated and the parts then assembled, with the bonding strip 11 between the surfaces to be joined and pressure block P inside both inserts 10, so as to exert pressure outwardly against both inserts simultaneously. Clamping cylinder C again confines the top of pressure block P and is held against the pressure block in any suitable manner, as by a bolt 16 extending into the anchor plate. For the same size of inserts and the same bonding material, the hole pattern shown in FIG. 3 will again be suitable. However, as indicated previously, the hole pattern may be changed, in the event that a different type of bonding material requiring different pressure and/or temperature is utilized.

The principles of this invention may also be applied to bonding of other types of surfaces, such as flat or irregular plates. Particularly when flat plates are involved, such as plates 50 and 51 of FIG. 6, as of dissimilar metal, which are to be bonded by a strip 52 of suitable bonding material, as of the type described previously, the two plates 50 and 51, with the strip 52 therebetween, following precoating, may be placed on an anchor plate A' with a pressure pad P' above. The assembly may be clamped to the anchor plate by a clamping plate 53, the clamping pressure of which may be adjusted by nuts 54 on peripheral studs 55 which extend upwardly from anchor plate A'. The periphery of pressure pad P' is confined by a depending flange 56 which may be attached, as by welding, to the underside of clamping plate 53 and extends downwardly past pressure pad P' and alongside plate 50 or below. Pressure pad P' may be provided with apertures in any suitable manner, preferably apertures which do not extend to the surface engaging the part against which pressure is to be applied, in this instance, the lower surface of the pressure pad. Thus, a series of spaced grooves 57, indicated by the dotted line may extend in one direction across the top of pressure pad P', while another series of spaced grooves 58 may extend transversely to grooves 57. It will be evident, of course, that other and different types of groove arrangements may be utilized. The anchor plate A′ of FIG. 6 may be placed on a heating platen, similar to heating platen H of FIGS. 2 and 4, or the entire assembly may be placed in an oven for heating to the desired temperature for the required period of time.

An alternative pressure pad P″ is illustrated in FIG. 7 and includes a central strip 60, as of silicone rubber, having a series of transverse holes 61 therein, strip 60 having flat surfaces and holes 61 normally being equal in diameter and equally spaced, although variations in both the spacing and diameter may be utilized, particularly where the configuration of the parts to be bonded is not precisely flat or boundary conditions require aperture variations. Pressure pad P″ also includes an upper strip 62 and a lower strip 63, also formed of a suitable expandable material, such as silicone rubber of 100 durometer. The strips 60, 62 and 63 may be attached together by an adhesive, so as to be handled as a unit, with strips 62 and 63 providing an outer surface to which the apertures do not extend, so that pressure pad P″ may be substantially reversible in position. However, there will undoubtedly be situations in which central strip 60 and only one of strips 62 or 63 may be necessary to secure the desired results.

Although several embodiments of the method and apparatus of this invention have been illustrated and described, it will be understood that other embodiments may exist and that numerous variations may be made therein, all without departing from the spirit and scope of this invention.

What is claimed is:

1. A method of bonding two parts together through heat and pressure fusion of a bonding material to said parts, comprising:
   clamping said parts with said bonding material between said parts and a confined, expandable, flowable material bearing against one of said parts, to apply pressure through said part to said bonding material;
   applying heat to said parts and said expandable material for a predetermined period of time; and
   uniformly aperturing said expandable material at a plurality of spaced locations to control the applied pressure to said parts to be bonded by expansion of said material due to temperature increase thereof.

2. A method of bonding as defined in claim 1 wherein said step of aperturing said expandable material involves aperturing said expandable material at a plurality of spaced loctions in a direction perpendicular to the direction of applied force on said parts to be bonded.

3. The method of bonding as defined in claim 1 further comprising the step of subjecting said expandable material to a predetermined mechanical pressure prior to heating thereof.

4. Apparatus for bonding two parts together through heat and pressure fusion from a bonding material to said parts, comprising:
   means for clamping said parts with said bonding material between said parts;
   means formed of expadnable, flowable material bearing against one of said parts;
   means for confining said expandable means, whereby said expandable material will apply pressure through said part to said bonding material, upon heating of said parts and said expandable material for a predetermined period of time; and
   a series of apertures in said expandable material for controlling the pressure applied to said part.

5. Bonding apparatus, as defined in claim 4, wherein said expandable material comprises silicone rubber.

6. Bonding apparatus, as defined in claim 4, wherein said apertures are spaced from the part against which said expandable material exerts pressure upon heating.

7. Bonding apparatus, as defined in claim 4, including means for producing a predetermined pressure on said confined, expandable material prior to heating.

8. Bonding apparatus, as defined in claim 4, wherein:
   said parts are arcuate at the surfaces to be joined;
   said expandable material has a cylindrical outer surface which engages the inside of one of the parts to be joined; and
   said apertures are spaced from said outer surface and extend uniformly throughout said material perpendicular to the direction of useful force application on the parts to be bonded.

9. Bonding apparatus, as defined in claim 8, wherein:
   said expandable material comprises a cylindrical block having holes extending axially thereof;
   said means for confining said expandable material includes a cylinder bearing axially against said block; and
   means for adjusting the pressure of said cylinder against said block.

10. Bonding apparatus, as defined in claim 4, wherein:
    at least a portion of the surfaces of said parts to be bonded are flat; and
    said expandable material comprises at least one strip having flat surfaces and adapted to be clamped against a flat surface of one of the parts to be bonded, opposite the surface to be bonded.

11. Bonding apparatus, as defined in claim 10, wherein: said apertures comprise grooves in said strip in the surface of said strip opposite the surface engaging said part to be bonded.

12. Bonding apparatus, as defined in claim 10, wherein:
    said expandable material comprises a series of superimposed flat strips;
    one of said strips bearing against a part to be bonded is imperforate; and
    another of said strips has transverse holes therethrough.

References Cited

UNITED STATES PATENTS 2,424,878   7/1947   Crook.
3,184,362   5/1965   Litsky et al. _____ 156—294

REUBEN EPSTEIN, Primary Examiner

U.S. Cl. X.R.

156—228, 243, 294, 423